Patented Nov. 15, 1949

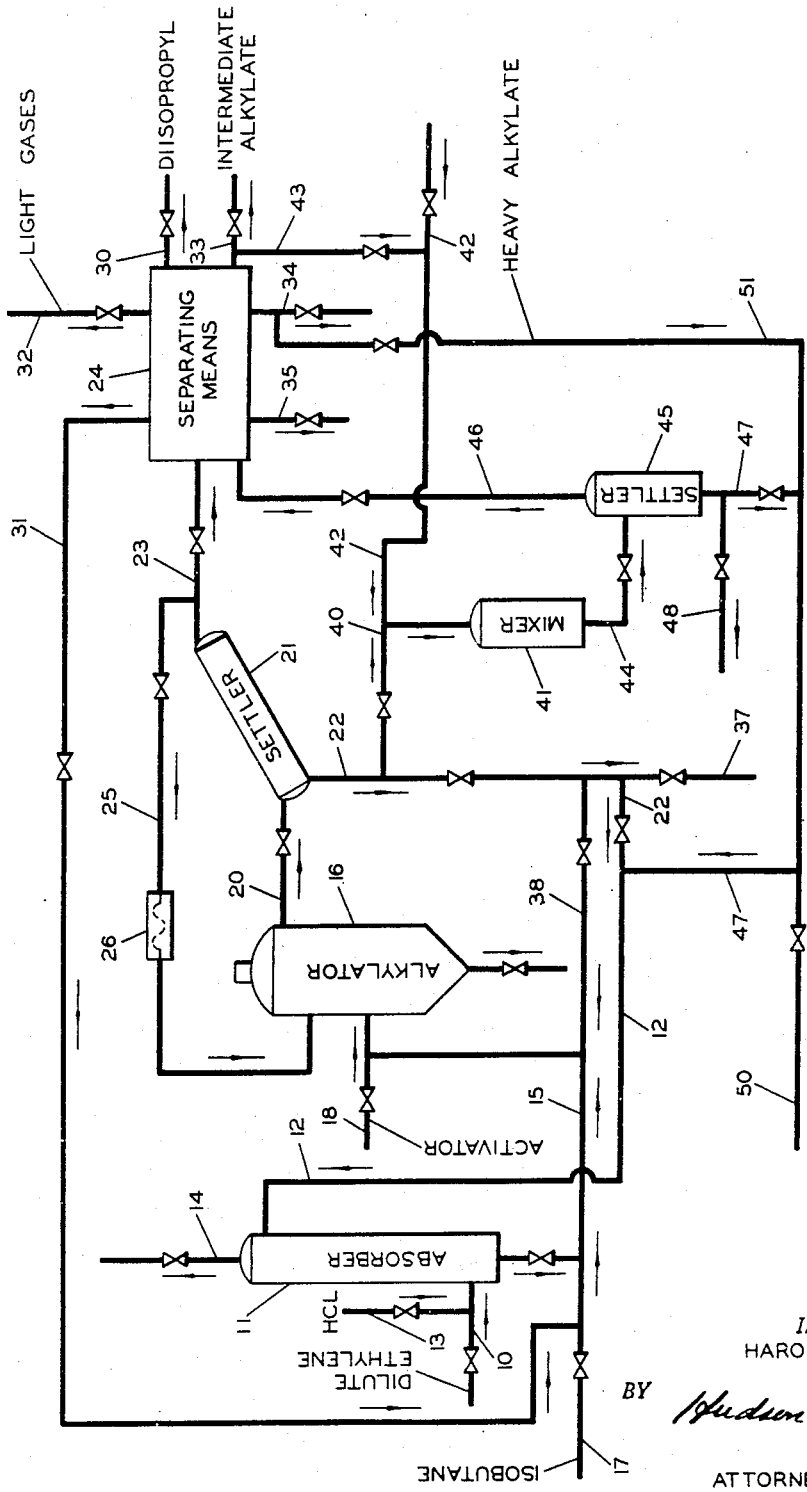

2,488,190

UNITED STATES PATENT OFFICE 2,488,190

ALKYLATION PROCESS

Harold J. Hepp, Bartlesville, Okla., assignor to Phillips Petroleum Company, a corporation of Delaware Application June 3, 1946, Serial No. 674,016

16 Claims. (Cl. 260—683.4)

This invention relates to the conversion of hydrocarbons in the presence of aluminum halide catalysts. In particular embodiments it relates to alkylation of alkylatable hydrocarbons by reaction with low-boiling olefins in the presence of liquid hydrocarbon-aluminum halide catalysts. In one specific embodiment it relates to the reaction of isobutane and ethylene to produce diisopropyl.

Aluminum halide catalysts have been used in numerous processes for the conversion of hydrocarbons, including decomposition or cracking of high-boiling hydrocarbons, isomerization of low-boiling hydrocarbons, and alkylation of alkylatable hydrocarbons, including isoparaffins, normal paraffins, cycloparaffins, and aromatic hydrocarbons. In such processes these catalysts have been used as such, suspended in or dissolved in a reaction mixture, suspended on solid supports such as active carbon, activated alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched, normally liquid paraffin hydrocarbons boiling in the boiling ranges of those fractions generally identified as gasoline and kerosine. In most instances it is desirable to have present a small amount of a hydrogen halide, sometimes only about 0.1 to about 1 to 5 per cent by weight. This material may be present as a result of side reactions, such as when water is present in a charge stock, when an organic halogen compound is present in a charge stock, when some interreaction between an aluminum halide and hydrocarbon takes place, or when a hydrogen halide is deliberately added. Since it is substantially impossible to effect complete dehydration of all equipment and materials, especially in a commercial process, conversions with aluminum halide catalysts are often conducted without the knowledge or appreciation that minor amounts of a hydrogen halide are present.

In many instances olefins to be reacted with alkylatable hydrocarbons are present in refinery streams in relatively low concentrations, for example, from about 3 to 4 mol per cent to about 25 or 30 mol per cent. Especially when ethylene or propylene is the olefin reactant, the corresponding accompanying paraffin hydrocarbons not only dilute the reaction mixture but necessitate the use of reaction pressures of several hundred pounds per square inch absolute, whereas if such paraffin hydrocarbons were either completely absent or present in very small amounts markedly lower reaction pressures would be satisfactory. I have now discovered that aluminum halide-hydrocarbon complexes which are satisfactory catalysts in such alkylation reactions will dissolve or absorb olefins. I have also found that this absorption is highly selective in that accompanying corresponding paraffin hydrocarbons, methane, and/or hydrogen are not appreciably absorbed by the complex. I have also found that if the temperature of the absorption is maintained relatively low and if the total time between the initial contact of the complex with the olefin-containing mixture and the contact of the olefin-rich absorption liquid with an alkylatable hydrocarbon is low, undesired reactions between the complex and the olefin do not take place to undesirably large extents. These results are particularly favorable when ethylene is the olefin absorbed by the complex and subsequently reacted with an alkylatable hydrocarbon.

An object of this invention is to convert hydrocarbons in the presence of a hydrocarbon-aluminum halide complex catalyst.

Another object of this invention is to effect alkylation of alkylatable hydrocarbons with ethylene in the presence of aluminum halide catalysts.

Still another object of this invention is to maintain a liquid hydrocarbon-aluminum halide complex catalyst at a low viscosity when such a catalyst is used for the conversion of hydrocarbons.

Still another object of this invention is to react isobutane and ethylene to produce high yields of diisopropyl.

Other objects and advantages of this invention will become apparent to one skilled in the art from the accompanying disclosure and discussion.

When using liquid hydrocarbon-aluminum halide catalysts for the alkylation of hydrocarbons with olefins it is not unusual to have the viscosity of the catalyst increase during use to an extent such that it has a viscosity of about 2,000 centistokes, or more, when measured at 100° F. However, it is difficult to obtain adequate contacting between the catalyst and the hydrocarbon phases and to pump and otherwise handle the liquid catalyst when its viscosity is above about 500 centistokes at 100° F. In order to permit easy handling of the catalyst and intimate contacting thereof with the reaction mixture it is preferable to maintain the viscosity of the catalyst below 200 centistokes at 100° F.

The viscosity of the catalyst has been successfully determined in practice by the use of a Brookfield viscosimeter. The principle upon which this instrument operates is the measure of the drag produced upon a cylinder or disk rotating at a definite constant speed while immersed in the material under test. Numerical viscosity values can be read directly from a dial. This type of instrument is particularly well adapted to the measurement of hydrocarbon-aluminum halide complexes since the complex can be protected from the air by having a hydrocarbon layer on top of the complex. Such a hydrocarbon layer will be substantially less viscous than the complex being tested and does not interfere in any way with the accuracy of the determination.

Aluminum chloride is the halide which will most generally be used in the practice of my invention although it is not outside of the broadest concepts of the invention to use other aluminum halides, particularly aluminum bromide. While aluminum fluoride generally does not give satisfactory results, mixed halides such as AlCl₂F, AlClF₂, AlBr₂F, and the like, may often be used successfully. Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 per cent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosine. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. Two general types of catalyst have been prepared. These may be characterized as high-aluminum halide and low-aluminum halide types. When preparing a catalyst with aluminum chloride the high-aluminum chloride type contains 80 to 85 per cent by weight of aluminum chloride and is a yellow highly viscous material. The low-aluminum chloride type contains about 55 per cent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways as by adding aluminum halide directly to recirculated catalyst or by dissolving aluminum halide in one of the streams charged to the reaction zone. The liquid complex should not be contaminated with water or other reactive, oxygen-containing compounds.

It appears that a rough estimation of the catalyst activity may be obtained by determining the heat evolved when water is added to a sample of the catalyst. When this test is made at room temperature a satisfactory catalyst will generally produce between about 275 and 360 calories per gram, preferably between about 310 and about 330 calories per gram, when sufficient water has been added to effect complete reaction.

The practice of my invention will now be illustrated in connection with the accompanying drawing which forms a part of this specification. This drawing is a diagrammatic flow sheet which shows schematically various pieces of apparatus which may be used in the practice of a preferred modification of my invention. The discussion of the drawing will be presented in connection with the reaction of isobutane with ethylene which is contained in a mixture comprising ethane, methane and some hydrogen, together with a small amount of propylene and propane, which is one embodiment of my invention.

Referring now to the drawing, an ethylene-containing stream is introduced through conduit 10 to a low point of absorber 11. A stream such as is typical for use in this process results from the high-temperature, non-catalytic decomposition of an ethane-propane mixture and has approximately the following composition, after being freed from C₄ and heavier hydrocarbons:

|  | Mol per cent |
|---|---|
| Hydrogen | 15.4 |
| Methane | 31.9 |
| Ethylene | 28.4 |
| Ethane | 12.2 |
| Propylene | 8.4 |
| Propane | 3.7 |
|  | 100.0 |

To a high portion of absorber 11 is passed an absorption liquid comprising an aluminum chloride-hydrocarbon complex, such as is discussed herein. The absorption is carried out under a pressure sufficiently high that the partial pressure of the ethylene is at least about one atmosphere (i. e., at least about 14 pounds per square inch absolute). Generally, however, the olefin partial pressure need not exceed about 100 pounds per square inch absolute. The temperature of the absorption is preferably between about 40 and about 120° F. If desired, a small amount of hydrogen chloride may be added along with the ethylene being introduced from a suitable outside source through conduit 13. This hydrogen chloride should be added in amount which is stoichiometrically less than the amount of olefin being introduced, and preferably may be between about 0.1 and about 10 mol per cent of this olefin. The ratio of aluminum chloride-hydrocarbon complex, introduced in the absorption liquid through conduit 12, to olefin, introduced through conduit 10, should be between about 10:1 and 500:1 by weight. The gases introduced through conduit 10 are countercurrently contacted with the absorption liquid so that intimate mixing of the two takes place. Unabsorbed gases are discharged through conduit 14 and are generally substantially free from olefin. The olefin-rich absorption liquid is discharged from the bottom of absorber 11 and is passed through conduit 15 to alkylation contactor 16. Isobutane in amount appreciably in excess of the olefin is maintained in alkylator 16. Make-up isobutane from any suitable outside source is introduced through conduit 17, preferably into the olefin-rich absorption liquid immediately after it leaves the absorber 11. If desired, hydrogen chloride, either as such or as an equivalent amount of an alkyl halide or water, may be introduced through conduit 18. The hydrocarbon reaction mixture and catalyst are intimately contacted in alklator 16.

The catalyst itself is substantially insoluble in paraffin and naphthene hydrocarbons and these hydrocarbons are not substantially soluble in it. It is preferred to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions the hydrocarbon phase is the continuous phase and the catalyst phase is the discontinuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory. Under such conditions it is quite difficult to obtain adequate physical separation between the hydrocarbon phase and the catalyst phase and a considerable amount of power is required in order to adequately mix hydrocarbons and catalyst charged to the reaction zone.

Under the preferred conditions adequate and intimate admixing of hydrocarbons and catalyst may be obtained by efficient stirrers, by injecting reactants into the reaction zone in jets with stream velocities of 50 to 500 feet per second, by turbulent flow conditions through a long tube coil, by intimately contacting hydrocarbons and catalyst concurrently or countercurrently in vertical towers containing suitable baffle elements, or by other suitable means.

A preferred reaction temperature for this conversion is between about 50 and about 200° F., preferably about 80 to about 175° F. When alkylating hydrocarbons the activity of the catalyst herein described is sufficiently high that even ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl I prefer to operate at flow rates between about 0.2 and about 1.5 gallons of total alkylate produced per gallon of catalyst present in the reactor per hour. Thus, when reacting isobutane and ethylene in a reactor having a total internal volume of 1000 gallons and with a hydrocarbon to catalyst ratio within the reactor of 3:2 and a flow rate of 1.25 gallons of alkylate per gallon of catalyst per hour, the flow rate of alkylate should be such that 500 gallons of alkylate are produced per hour.

A mixture of hydrocarbons and catalyst is withdrawn from alkylator 16 through conduit 20 to settler 21. In settler 21 a heavy catalyst phase settles from the lighter hydrocarbon phase. The heavy catalyst phase is withdrawn through conduit 22. A hydrocarbon phase is removed from separator 21 through conduit 23 and at least a substantial portion thereof is passed to separating means 24. In many instances it is desirable to return directly to the alkylator a major portion of the hydrocarbon phase. This is accomplished by diverting a desired portion of the material from conduit 23 through conduit 25 for direct recirculation to the reactor. This returned stream is generally cooled by cooler 26 to offset the exothermic heat of reaction and maintain a desired alkylation temperature.

Separating means 24 will comprise the necessary equipment for washing the hydrocarbon material with an alkaline solution to remove any acidic materials which may be present, a series of fractional distillation columns and associated equipment, for removing desired hydrocarbon fractions from the alkylation effluents, and any other usual equipment for purifying such hydrocarbon fractions. A diisopropyl fraction is separated and removed through conduit 30 as a product of the process. Unreacted isobutane is separated through conduit 31 and returned to the process, such as by being introduced into conduit 15. Any normal butane and any propane and lighter gases can be discharged through conduit 32. An intermediate alkylate fraction, generally comprising primarily hexanes of low octane number and octanes, is recovered as another product of the process through conduit 33. A heavy alkylate fraction is also separated through conduit 34. Such a fraction will comprise primarily $C_9$ to $C_{14}$ paraffin hydrocarbons. Heavier hydrocarbons can be discharged as a tar through conduit 35.

The liquid aluminum chloride-hydrocarbon complex catalyst, which has been passed from settler 21 through conduit 22, may be returned in part to alkylator 16 through conduit 38. It is often desirable to discharge at least a portion of this material from the process through conduit 37. In accordance with the present invention a major portion of this catalytic material is passed through conduit 12 to absorber 11 as the absorption liquid as previously discussed. In many instances, however, the material directly removed from settler 21 contains an appreciable amount of hydrocarbon material which is not bound up with aluminum chloride in the form of a complex. This hydrocarbon material will inevitably comprise an appreciable proportion of valuable low-boiling paraffin hydrocarbons which are sufficiently volatile to be removed through conduit 14 if they enter absorber 11. It is therefore desirable to remove such materials. This may be accomplished by passing any desired portion of the catalytic complex from conduit 22 through conduit 40 to mixer 41 where it is intimately mixed with a suitable paraffinic hydrocarbon material introduced through conduit 42. A suitable paraffinic hydrocarbon material is the intermediate alkylate fraction previously discussed. This may be utilized as a wash liquid by being passed from conduit 33 through conduit 43 to conduit 42 and mixer 41. This hydrocarbon liquid is mixed with the catalyst, preferably without any substantial change in temperature and with a hydrocarbon to catalyst ratio between about 0.5:1 and 10:1, by volume. The resulting mixture is passed through conduit 44 to a settler 45. In settler 45 the two immiscible phases separate. The hydrocarbon phase is removed through conduit 46 and may be passed to separating means 24 for recovery of valuable constituents. The washed complex is discharged from settler 45 through conduit 47 and passed to conduit 12 and used as an absorption liquid. If it is desired to discharge a portion of the catalyst from the system this is conveniently done by discharging a portion of the material passing through conduit 47 through conduit 48, rather than discharging a portion of the unwashed catalyst through conduit 37.

The complex which is to be used as an absorption liquid, and after being washed with a hydrocarbon as discussed, may be emulsified with a suitable paraffinic hydrocarbon material having a relatively low volatility so that it will not be lost as a vapor through conduit 14. Such a relatively non-volatile hydrocarbon can be introduced through conduit 50. This is mixed with the complex in a ratio of about 1 to about 5 volumes of the complex per volume of added hydrocarbon. As a non-volatile hydrocarbon a suitable material is the heavy alkylate fraction discussed herein as being discharged through conduit 34. If desired, a suitable amount of this material may be passed through conduit 51 for admixture with the complex passing through conduit 47.

I have found that, although the aluminum chloride-hydrocarbon complex will absorb ethylene readily, the resulting mixture does not markedly increase in viscosity as a result of chemical reaction of the ethylene if the temperature is kept within the limits indicated and if the total time from initial contact of the complex with the ethylene to intimate mixing with alkylatable hydrocarbon is not greater than about 30 minutes. Substantially the same thing is true when higher olefins are being absorbed, but generally a shorter time, such as not greater than about 15 minutes, is desirable if the ethylene is accompanied by appreciable quantities of higher olefins or if higher olefins are the materials being primarily absorbed. For this reason, the conduit 15 joining absorber 11 and alkylator 16 should be as short as possible and surge tanks should not be inserted, or if they are used should be as small as can be tolerated. Adverse results are also minimized if the rich absorption liquid is immediately admixed with alkylatable hydrocarbon, as shown and previously discussed. In this way the best yields and the highest quantity of alkylate are produced.

It will be appreciated that the drawing is a schematic representation of process flow, and of equipment which may be used in conducting my invention upon a commercial basis. Various specific pieces of equipment such as alkylation contactors, fractional distillation columns, pumps, control valves, heaters, coolers, catalyst chambers, and the like are well known to those skilled in the art and suitable equipment can be readily assembled for any specific application of my invention by one so skilled by following the teachings contained herein.

The following are specific examples of the operation of modifications of my invention.

*Example I*

A stream of liquid aluminum chloride-hydrocarbon complex was continuously introduced at the top of a glass absorber column packed with glass rings and operated at about 79° F. The complex contained about 55 weight per cent of aluminum chloride. The complex flowed by gravity downwardly countercurrent to an ethylene-containing stream, which also contained 3.4 mol per cent hydrogen chloride, introduced at the bottom of the absorber. The partial pressure of ethylene was about 14.5 pounds per square inch absolute. Unabsorbed gases were vented from the top of the absorber through a drying tube. The ethylene-rich complex from the bottom of the absorber was continuously added to a reactor maintained at about 79° F. A molar excess of isopentane was continuously added to the reactor, the contents were maintained in intimate admixture by mechanical stirring, and a reaction mixture of hydrocarbon and catalyst complex continuously removed from the reactor to a settling chamber. The catalyst complex settled by gravity from the mixture, and was recycled to the absorber, and the hydrocarbon phase was removed and deisopentanized to recover the product formed.

A hexane-and-heavier fraction was recovered from the reactor effluents. The product had an initial boiling point of 99° F.; 9 per cent distilled at 102° F., 31 per cent at 165° F., 53 per cent at 192° F., and 64 per cent at 225° F.

*Example II*

In two other runs carried out under similar conditions, ethylene and isopentane were also reacted. In Run A ethylene was in contact with the complex absorption liquid for about 20 minutes prior to contact of the mixture with isopentane, in Run B the time was about 40 minutes. The increased amount of products lighter than $C_9$'s is readily apparent. The products had the following compositions.

| Component | Volume, per cent | |
|---|---|---|
| | Run A | Run B |
| Hexanes | 28.5 | 41 |
| Heptanes | 24.5 | 26 |
| Octanes | 5.0 | 6 |
| $C_9$ to 437° F., B. P. | 35.0 | 20 |
| Residue | 7.0 | 7 |
| | 100.0 | 100 |

It is to be appreciated that various modifications of my invention can be practiced without departing from the teachings and spirit of the disclosure, or from the scope of the claims. The claims are not to be unduly limited by limitations shown in the specific examples. By alkyl derivatives I means to include whatever products appear to be the primary reaction products. Thus, I intend to include diisopropyl as an ethyl derivative of isobutane, although it is not an "ethyl isobutane."

I claim:

1. An improved process for reacting an alkylatable hydrocarbon with a normally gaseous olefin admixed with other normally gaseous materials, which comprises passing such a normally gaseous olefin-containing mixture to an absorption zone under a pressure such that the partial pressure of olefin contained therein is at least about 14 pounds per square inch, introducing a hydrogen-halide along with said olefin-containing mixture in an amount between about 1 and about 10 mol per cent of said olefin, passing also to said absorption zone an absorption liquid comprising a liquid aluminum halide-hydrocarbon complex having a viscosity at 100° F. not greater than about 200 centistokes and having a heat of hydrolysis between about 275 and about 360 calories per gram, the weight ratio of said introduced complex to introduced olefin being between about 10:1 and about 500:1, contacting said absorption liquid and said mixture in said zone under conditions such as to effect an absorption of normally gaseous olefin in said liquid, discharging unabsorbed constituents from said absorption zone, separately removing a resulting olefin-rich aluminum halide-hydrocarbon complex from said absorption zone and passing same to an alkylation zone, introducing an alkylatable hydrocarbon into said alkylation zone and effecting an alkylation reaction between said alkylatable hydrocarbon and absorbed olefin in the presence of said complex as catalyst, and recovering from effluents of said alkylation zone hydrocarbons so produced.

2. The process of claim 1 in which said normally gaseous olefin is ethylene and in which said aluminum halide is aluminum chloride.

3. An improved process for reacting ethylene with an alkylatable hydrocarbon, which comprises passing a normally gaseous ethylene-containing mixture to an absorption zone, passing also to said absorption zone as an absorption liquid an intimate mixture of a liquid aluminum chloride-hydrocarbon complex and a high-boiling paraffinic hydrocarbon material, contacting said absorption liquid and said mixture in said zone under conditions such as to effect an absorption of ethylene in said absorption liquid, passing a resulting ethylene-containing liquid from said zone to an alkylation zone, introducing an alkylatable hydrocarbon into said alkylation zone and effecting an alkylation reaction between said alkylatable hydrocarbon and absorbed ethylene in the presence of said complex as catalyst, separating from effluents of said zone a catalyst phase and a hydrocarbon phase, washing said catalyst phase with a liquid paraffinic hydrocarbon material to remove accompanying hydrocarbon material, admixing with said washed catalyst phase a high-boiling liquid paraffinic hydrocarbon material and passing a resulting admixture to said absorption zone as said absorption liquid, and recovering from said hydrocarbon phase an ethyl derivative of said alkylatable hydrocarbon so produced.

4. The process of claim 3 in which said alkylatable hydrocarbon is a low-boiling isoparaffin.

5. The process of claim 3 wherein not more than about 30 minutes elapse between the introduction of said absorption liquid into said absorption zone and admixture of the corresponding ethylene-containing absorption liquid with an alkylatable hydrocarbon.

6. The process of claim 3 wherein said alkylatable hydrocarbon is a low-boiling isoparaffin, said catalyst phase is washed with a relatively volatile alkylate fraction, and said washed catalyst phase is admixed with a relatively nonvolatile alkylate fraction with a ratio of said catalyst phase to hydrocarbon in the resulting admixture between about 1:1 and about 5:1 by volume to form said absorption liquid.

7. The process of claim 3 wherein the temperature during the absorption is maintained between about 40 and about 120° F.

8. An improved process for reacting a low-boiling olefin with an alkylatable hydrocarbon in the presence of an aluminum halide-hydrocarbon complex catalyst, which comprises passing an olefin-containing mixture to an absorption zone in admixture with a hydrogen halide in less than a stoichiometrically equivalent amount, passing also to said absorption zone an absorption liquid comprising a liquid aluminum halide-hydrocarbon complex having a viscosity at 100° F. not greater than about 200 centistokes and a heat of hydrolysis between about 275 and about 360 calories per gram in an amount between about 10 and about 500 times by weight of the olefin to be absorbed, intimately contacting said mixture and said liquid in said absorption zone, removing a resulting olefin-rich absorption liquid from said absorption zone and passing same to an alkylation zone, introducing an alkylatable hydrocarbon into said reaction zone and reacting same with said absorbed olefin in the presence of said complex as the alkylation catalyst, separating from effluents of said zone a catalyst phase and a hydrocarbon phase, washing said catalyst phase with a liquid paraffinic hydrocarbon material to remove accompanying hydrocarbon material, passing the resulting washed catalyst phase to said absorption zone as said absorption liquid, and effecting said absorption and transfer to said alkylation zone such that not more than about 30 minutes elapse between the introduction of said absorption liquid into said absorption zone and admixture of the corresponding olefin-rich absorption liquid with an alkylatable hydrocarbon.

9. The process of claim 8 in which said aluminum halide is aluminum chloride and said alkylatable hydrocarbon is a low-boiling isoparaffin.

10. An improved process for reacting a low-boiling olefin with an alkylatable hydrocarbon in the presence of an aluminum halide-hydrocarbon complex catalyst, which comprises passing an olefin-containing mixture to an absorption zone in admixture with a hydrogen halide in less than a stoichiometrically equivalent amount, passing also to said absorption zone an absorption liquid comprising a liquid aluminum halide-hydrocarbon complex in an amount between about 10 and about 500 times by weight of the olefin to be absorbed, intimately contacting said mixture and said liquid in said absorption zone, removing a resulting olefin-rich absorption liquid from said absorption zone and passing same to an alkylation zone, introducing an alkylatable hydrocarbon into said reaction zone and reacting same with said absorbed olefin in the presence of said complex as the alkylation catalyst, separating from effluents of said zone a catalyst phase and a hydrocarbon phase, admixing with said catalyst phase a high boiling liquid paraffinic hydrocarbon material and passing the resulting admixture to said absorption zone as said absorption liquid, and effecting said absorption and transfer to said alkylation zone such that not more than about 30 minutes elapse between the introduction of said absorption liquid into said absorption zone and admixture of the corresponding olefin-rich absorption liquid with an alkylatable hydrocarbon.

11. An improved process for reacting a normally gaseous olefin with an alkylatable hydrocarbon, which comprises passing a normally gaseous olefin-containing mixture to an absorption zone, passing also to said absorption zone as an absorption liquid an intimate mixture of a liquid aluminum halide-hydrocarbon complex and a high-boiling paraffinic hydrocarbon material, contacting said absorption liquid and said mixture in said zone under conditions such as to effect an absorption of olefin in said absorption liquid, passing a resulting olefin-containing liquid from said zone to an alkylation zone, introducing an alkylatable hydrocarbon into said alkylation zone and effecting an alkylation reaction between said alkylatable hydrocarbon and absorbed olefin in the presence of said complex as catalyst, separating from effluents of said zone a catalyst phase and a hydrocarbon phase, washing said catalyst phase with a liquid paraffinic hydrocarbon material to remove accompanying hydrocarbon material, admixing with said washed catalyst phase a high-boiling liquid paraffinic hydrocarbon material and passing a resulting admixture to said absorption zone as said absorption liquid, and recovering from said hydrocarbon phase an alkyl derivative of said alkylatable hydrocarbon so produced.

12. An improved process for reacting ethylene with an alkylatable hydrocarbon, which comprises passing a normally gaseous ethylene-containing mixture to an absorption zone, passing also to said absorption zone an absorption liquid described hereinafter, contacting said absorption liquid and said mixture in said zone under conditions such as to effect an absorption of ethylene in said absorption liquid, passing a resulting ethylene-containing liquid from said zone to an alkylation zone, introducing an alkylatable hydrocarbon into said alkylation zone and effecting an alkylation reaction between said alkylatable hydrocarbon and absorbed ethylene in the presence of said absorption liquid as a catalyst, separating from effluents of said zone a catalyst phase and a hydrocarbon phase, washing said catalyst phase with a liquid paraffinic hydrocarbon material to remove accompanying hydrocarbon material, admixing with said washed catalyst phase a high boiling liquid paraffinic hydrocarbon material and passing a resulting admixture to said absorption zone as the absorption liquid aforesaid in an amount between about 10 and about 500 times by weight of the olefin to be absorbed, said absorption liquid comprising a liquid aluminum halide-hydrocarbon complex having a viscosity not greater than about 200 centistokes at 100° F. and a heat of hydrolysis between about 275 and about 360 calories per gram.

13. The process of claim 12 wherein said alkylatable hydrocarbon is isobutane, said catalyst phase is washed with a relatively volatile alkylate fraction, and said washed catalyst phase is admixed with a relatively non-volatile alkylate fraction with a ratio of said catalyst phase to hydrocarbon in the resulting admixture between about 1:1 and about 5:1 by volume to form said absorption liquid.

14. The process of claim 12 wherein the temperature during the absorption is maintained between about 40 and about 120° F.

15. An improved process for reacting a normally gaseous olefin-containing mixture with an alkylatable hydrocarbon, which comprises passing a normally gaseous olefin-containing mixture to an absorption zone in admixture with a hydrogen halide, passing also to said absorption zone as an absorption liquid an intimate mixture of a liquid aluminum halide-hydrocarbon complex and a high boiling paraffinic hydrocarbon material, contacting said absorption liquid and said mixture in said zone under conditions such as to effect an absorption of the olefin in said absorption liquid, passing a resulting olefin-containing liquid from said zone to an alkylation zone, introducing an alkylatable hydrocarbon into said alkylation zone and effecting an alkylation reaction between said alkylatable hydrocarbon and absorbed olefin in the presence of said complex as catalyst, separating from effluents of said zone a catalyst phase and a hydrocarbon phase, washing said catalyst phase with a liquid paraffinic hydrocarbon material to remove accompanying hydrocarbon material, admixing with said washed catalyst phase a high boiling liquid paraffinic hydrocarbon material and passing a resulting admixture to said absorption zone as said absorption liquid, and recovering from said hydrocarbon phase an alkyl derivative of said alkylatable hydrocarbon so produced.

16. The process of claim 15 wherein said alkylatable hydrocarbon is a low boiling isoparaffin, said hydrogen halide is hydrogen chloride, said normally gaseous olefin is predominantly ethylene, said catalyst phase is washed with a relatively volatile alkylate fraction, and said washed catalyst phase is admixed with a relatively non-volatile alkylate fraction with a ratio of said catalyst phase to hydrocarbon in the resulting admixture between about 1:1 and about 5:1 by volume to form said absorption liquid.

HAROLD J. HEPP.

REFERENCES CITED

The following references are of record in the file of this patent:

UNITED STATES PATENTS

| Number | Name | Date |
| --- | --- | --- |
| 2,257,086 | Atwell | Sept. 30, 1941 |
| 2,308,560 | Carmody et al. | Jan. 19, 1943 |
| 2,387,162 | Matuszak | Oct. 16, 1945 |
| 2,415,717 | Watkins et al. | Feb. 11, 1947 |